(12) United States Patent
Li et al.

(10) Patent No.: US 11,576,092 B2
(45) Date of Patent: Feb. 7, 2023

(54) HANDOVER HANDLING METHOD AND APPARATUS

(71) Applicant: Huawei Technologies Co., Ltd., Shenzhen (CN)

(72) Inventors: Fei Li, Shenzhen (CN); Linping Yang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/939,926

(22) Filed: Jul. 27, 2020

(65) Prior Publication Data

US 2020/0359280 A1  Nov. 12, 2020

Related U.S. Application Data

(63) Continuation of application No. PCT/CN2020/081779, filed on Mar. 27, 2020.

(30) Foreign Application Priority Data

Apr. 29, 2019 (CN) .......................... 201910356843.8

(51) Int. Cl.
*H04W 36/00* (2009.01)
*H04W 12/10* (2021.01)
(Continued)

(52) U.S. Cl.
CPC ..... *H04W 36/0077* (2013.01); *H04W 12/041* (2021.01); *H04W 12/10* (2013.01); *H04W 36/0038* (2013.01); *H04W 76/25* (2018.02)

(58) Field of Classification Search
CPC ..... H04W 76/16–38; H04W 88/00–06; H04W 8/00–245; H04L 63/123
See application file for complete search history.

(56) References Cited

U.S. PATENT DOCUMENTS

2009/0220087 A1* 9/2009 Brusilovsky ........ H04W 12/041
380/272
2010/0002883 A1* 1/2010 Sammour ........... H04L 63/1416
380/272
(Continued)

FOREIGN PATENT DOCUMENTS

CN        101299884 A      11/2008
CN        102281535 A      12/2011
(Continued)

OTHER PUBLICATIONS

Huawei et al.,"Clarification on UE behavior after handover failure",3GPP TSG-RAN WG2 Meeting #104 R2-1818096, Spokane, USA, Nov. 12-16, 2018,total 5 pages.
(Continued)

*Primary Examiner* — San Htun
(74) *Attorney, Agent, or Firm* — Conley Rose, P.C.

(57) ABSTRACT

A handover handling method and apparatus applied to a scenario in which user equipment (UE) is handed over from a first access and management function (AMF) to a second AMF, and where the method includes receiving, by the UE, a handover command message from a first access network device, wherein the handover command message carries a Non-Access Stratum container (NASC), performing, by the UE, integrity verification on the NASC, and continuing, by the UE, to use a first NAS security context when the integrity verification performed on the NASC fails, wherein the first NAS security context is a security context used between the UE and the first AMF.

37 Claims, 7 Drawing Sheets

(51) Int. Cl.
*H04W 76/25* (2018.01)
*H04W 12/041* (2021.01)

(56) References Cited

U.S. PATENT DOCUMENTS

| | | | |
|---|---|---|---|
| 2011/0135095 A1 | 6/2011 | Zhang et al. | |
| 2013/0114813 A1 | 5/2013 | Chai | |
| 2016/0037391 A1* | 2/2016 | Suh | H04W 76/11 |
| | | | 455/411 |
| 2018/0309575 A1 | 10/2018 | Nair | |
| 2019/0037407 A1 | 1/2019 | Nair et al. | |
| 2019/0141523 A1 | 5/2019 | Ben Henda et al. | |
| 2019/0268753 A1 | 8/2019 | Chen et al. | |
| 2020/0128402 A1* | 4/2020 | Niemi | H04W 36/0038 |
| 2020/0137643 A1 | 4/2020 | Li et al. | |
| 2020/0396650 A1 | 12/2020 | Nakarmi et al. | |

FOREIGN PATENT DOCUMENTS

| | | |
|---|---|---|
| CN | 106507348 A | 3/2017 |
| CN | 109155909 A | 1/2019 |
| CN | 109587685 A | 4/2019 |
| CN | 109600803 A | 4/2019 |
| CN | 109644340 A | 4/2019 |
| WO | 2018138347 A1 | 8/2018 |
| WO | 2018141269 A1 | 8/2018 |
| WO | 2019053185 A1 | 3/2019 |

OTHER PUBLICATIONS

Huawei et al.,"Discussion on error and key handling on UE for Reestablishment Procedure in case of N2 handover failure",3GPP TSG-RAN WG2#104 R2-1817842,Spokane, USA, Nov. 12-16, 2018,total 9 pages.

3GPP TS 33.501 V15.4.0, "3rd Generation Partnership Project; Technical Specification Group Services and System Aspects; Security architecture and procedures for 5G system (Release 15)," Mar. 2019, 187 pages.

3GPP TS 23.502 V16.0.2 "3rd Generation Partnership Project; Technical Specification Group Services and System Aspects; Procedures for the 5G System; Stage 2 (Release 16)," Apr. 2019, 419 pages.

Huawei, et al.,"Correction for handover failure (T304 expiry or Inability to comply with RRCReconfiguration)," 3GPP TSG-RAN WG2 Meeting #104, R2-1817841, Spokane (WA), USA, Nov. 12-16, 2018, 4 pages.

"3GPP TS 24.501 V16.0.2," Mar. 2018, 480 pages.

* cited by examiner

HANDOVER HANDLING METHOD AND APPARATUS

CROSS-REFERENCE TO RELATED APPLICATIONS

This application is a continuation of International Patent Application No. PCT/CN2020/081779 filed on Mar. 27, 2020, which claims priority to Chinese Patent Application No. 201910356843.8 filed on Apr. 29, 2019. The disclosures of the aforementioned applications are hereby incorporated by reference in their entireties.

TECHNICAL FIELD

The present disclosure relates to the communications field, and more further, to a handover handling method and apparatus.

BACKGROUND

In a 5th generation (5G) communication scenario, due to movement of user equipment (UE), an access network device handover scenario may exist. For example, a position change of the UE causes a change of an access network device serving the UE. Two types of access network device handovers are defined in a current communications protocol: an Xn handover and an N2 handover. The Xn handover means that an Xn interface exists between access network devices before and after an access network device handover occurs, and the access network device handover is performed based on the interface. The N2 handover means that an access network device handover is performed based on an N2 interface between an access network device and a core network element, namely, an access and mobility management function (AMF).

In an existing N2 handover scenario, when an access network device handover fails, a key on UE may be different from a key on a first AMF in a handover procedure. Consequently, after the access network device handover fails, the UE cannot re-establish a connection to the first AMF.

SUMMARY

This application discloses a handover handling method and apparatus. A first AMF stores a first Non-Access Stratum (NAS) security context and resumes using the first NAS security context, to ensure that a security context on UE is the same as a security context on the first AMF when an access network device handover fails, and further ensure that a key on the UE is the same as a key on the first AMF.

According to a first aspect, a handover handling method is provided, including receiving, by a first AMF, a handover request message sent by a first access network device, storing, by the first AMF, a first NAS security context when determining that key derivation needs to be performed, where the first NAS security context is a NAS security context generated through negotiation between the first AMF and UE, and resuming, by the first AMF, using the first NAS security context.

According to the handover handling method provided in this embodiment of this application, when the key derivation needs to be performed, the first AMF stores the first NAS security context, and resumes using the first NAS security context after the key derivation such that a key on the UE is the same as a key on the first AMF when an access network device handover fails.

It should be understood that the first NAS security context in this embodiment of this application may also be referred to as a NAS security context currently used by the UE.

With reference to the first aspect, in some implementations of the first aspect, the first NAS security context includes a first NAS security algorithm, a first AMF key Kamf 1, a first NAS key, and a first NAS count.

According to the handover handling method provided in this embodiment of this application, the first NAS security context includes the AMF key Kamf 1 negotiated for use between the first AMF and the UE, the NAS key generated through negotiation between the first AMF and the UE, and the NAS count.

With reference to the first aspect, in some implementations of the first aspect, resuming, by the first AMF, using the first NAS security context includes resuming, by the first AMF, using the first NAS security context after the first AMF initiates a user context creation service request to a second AMF.

According to the handover handling method provided in this embodiment of this application, the first AMF may resume using the first NAS security context after, before, or when the first AMF initiates the user context creation service request to the second AMF.

According to a second aspect, a handover handling method is provided, including receiving, by UE, a handover command message sent by a first access network device, where the handover command message carries a second NAS security algorithm selected by a second AMF and an AMF key change indication, storing, by the UE, a first NAS security context when the second NAS security algorithm is different from a first NAS security algorithm currently used by the UE and/or the AMF key change indication is a preset value, where the first NAS security context is a NAS security context generated through negotiation between the UE and a first AMF, and when the UE fails to be handed over, using the first NAS security context to perform NAS protection between the UE and the first AMF, or when an integrity check performed by the UE on a container (NASC) fails, continuing, by the UE, to use the first NAS security context, where the NASC is carried in the handover command message.

According to the handover handling method provided in this embodiment of this application, when the handover command message received by the UE carries the second NAS security algorithm and/or the AMF key change indication is 1, the UE stores the first NAS security context, and when the UE fails to be handed over, the UE uses the first NAS security context to perform NAS protection between the UE and the first AMF, or when the NASC integrity check performed by the UE fails, the UE continues to use the current first NAS security context such that a key on the UE is the same as a key on the first AMF.

With reference to the second aspect, in some implementations of the second aspect, the first NAS security context includes the first NAS security algorithm, a first AMF key Kamf 1, a first NAS key, and a first NAS count.

According to the handover handling method provided in this embodiment of this application, the first NAS security context includes the AMF key Kamf 1 negotiated for use between the first AMF and the UE, the NAS key generated through negotiation between the first AMF and the UE, and the NAS count.

With reference to the second aspect, in some implementations of the second aspect, that the AMF key change indication is a preset value includes the AMF key change indication is 1.

According to the handover handling method provided in this embodiment of this application, when the value of the AMF key change indication is 1, it indicates that key derivation is performed.

According to a third aspect, a handover handling method is provided, including receiving, by a first AMF, a handover request message sent by a first access network device, performing, by the first AMF, key derivation according to a local policy to obtain a second AMF key, generating, by the first AMF, a second NAS security context based on the second AMF key and a first NAS security algorithm, where the first NAS security algorithm is a NAS security algorithm negotiated between the first AMF and UE, and using, by the first AMF, the second NAS security context to perform NAS protection between the first AMF and the UE.

According to the handover handling method provided in this embodiment of this application, when the first AMF generates the second AMF key by performing the key derivation, the first AMF may generate the second NAS security context based on the second AMF key and the first NAS security algorithm negotiated between the first AMF and the UE.

With reference to the third aspect, in some implementations of the third aspect, the second NAS security context includes the first NAS security algorithm, the second AMF key, a second NAS key, and a second NAS count.

According to a fourth aspect, a handover handling method is provided, including receiving, by UE, a handover command message sent by a first access network device, where the handover command message carries a second NAS security algorithm selected by a second AMF and an AMF key change indication, and when the second NAS security algorithm is different from a first NAS security algorithm and the AMF key change indication is a preset value, storing, by the UE, the first NAS security algorithm, and performing key derivation to obtain a second AMF key, where the first NAS security algorithm is a NAS security algorithm negotiated between the UE and a first AMF.

According to the handover handling method provided in this embodiment of this application, when the handover command message received by the UE carries the second NAS security algorithm and the AMF key change indication is 1, the UE stores the first NAS security algorithm, and performs the key derivation based on the AMF key change indication to obtain the second AMF key. With reference to the fourth aspect, in some implementations of the fourth aspect, the UE generates a second NAS security context based on the second AMF key and the first NAS security algorithm.

According to the handover handling method provided in this embodiment of this application, the UE may generate the second NAS security context based on the newly generated second AMF key and the stored first NAS security algorithm.

With reference to the fourth aspect, in some implementations of the fourth aspect, when the UE fails to be handed over, the UE uses the second NAS security context to perform NAS security protection between the UE and the first AMF.

According to the handover handling method provided in this embodiment of this application, when the UE fails to be handed over, the UE uses the second NAS security context to perform the NAS security protection between the UE and the first AMF.

With reference to the fourth aspect, in some implementations of the fourth aspect, when the UE fails to be handed over, the UE generates a second NAS security context based on the second AMF key and the first NAS security algorithm, and uses the second NAS security context to perform NAS security protection between the UE and the first AMF.

According to the handover handling method provided in this embodiment of this application, when the UE fails to be handed over, the UE first generates the second NAS security context based on the newly generated second AMF key and the stored first NAS security algorithm, and then uses the second NAS security context to perform the NAS security protection between the UE and the first AMF.

With reference to the fourth aspect, in some implementations of the fourth aspect, that the AMF key change indication is a preset value includes that the AMF key change indication is 1.

According to the handover handling method provided in this embodiment of this application, when the value of the AMF key change indication is 1, it indicates that key derivation is performed.

According to a fifth aspect, a handover handling apparatus is provided. The apparatus may be configured to perform an operation of the UE in any one of the first aspect or the possible implementations of the first aspect or an operation of the UE in any one of the third aspect or the possible implementations of the third aspect. Further, the handover handling apparatus may include a corresponding means configured to perform a step or function described in any one of the first aspect or the possible implementations of the first aspect or a step or function described in any one of the third aspect or the possible implementations of the third aspect. The corresponding means may be the UE in the first aspect or the third aspect or a chip or a functional module in the UE in the first aspect or the third aspect. The step or function may be implemented by software, hardware, or a combination of hardware and software.

According to a sixth aspect, a handover handling apparatus is provided. The apparatus may be configured to perform an operation of the first AMF in any one of the second aspect or the possible implementations of the second aspect or an operation of the first AMF in any one of the fourth aspect or the possible implementations of the fourth aspect. Further, the handover handling apparatus may include a corresponding means configured to perform a step or function described in any one of the second aspect or the possible implementations of the second aspect or a step or function described in any one of the fourth aspect or the possible implementations of the fourth aspect. The corresponding means may be the first AMF in the second aspect or the fourth aspect or a chip or a functional module in the first AMF in the second aspect or the fourth aspect. The step or function may be implemented by software, hardware, or a combination of hardware and software.

According to a seventh aspect, a communications device is provided, including a processor, a transceiver, and a memory. The memory is configured to store a computer program. The transceiver is configured to perform sending and receiving steps in the handover handling method in any one of the first aspect to the fourth aspect or the possible implementations of the first aspect to the fourth aspect. The processor is configured to invoke the computer program from the memory and run the computer program, to enable the communications device to perform the handover handling method in any one of the first aspect to the fourth aspect or the possible implementations of the first aspect to the fourth aspect.

Optionally, there are one or more processors, and there are one or more memories.

Optionally, the memory may be integrated with the processor, or the memory and the processor are separately disposed.

Optionally, the transceiver may include a transmitter and a receiver.

According to an eighth aspect, a system is provided. The system includes the handover handling apparatuses provided in the fifth aspect and the sixth aspect.

According to a ninth aspect, a computer program product is provided. The computer program product includes a computer program (which may also be referred to as code or an instruction). When the computer program is run, a computer is enabled to perform the method in any one of the first aspect to the fourth aspect or the possible implementations of the first aspect to the fourth aspect.

According to a tenth aspect, a computer-readable medium is provided. The computer-readable medium stores a computer program (which may also be referred to as code or an instruction). When the computer program is run on a computer, the computer is enabled to perform the method in any one of the first aspect to the fourth aspect or the possible implementations of the first aspect to the fourth aspect.

According to an eleventh aspect, a chip system is provided, and includes a memory and a processor. The memory is configured to store a computer program. The processor is configured to invoke the computer program from the memory and run the computer program, to enable a communications device on which the chip system is installed to perform the method in any one of the first aspect to the fourth aspect or the possible implementations of the first aspect to the fourth aspect.

DESCRIPTION OF EMBODIMENTS

The following describes technical solutions of this application with reference to the accompanying drawings.

Figure 1:
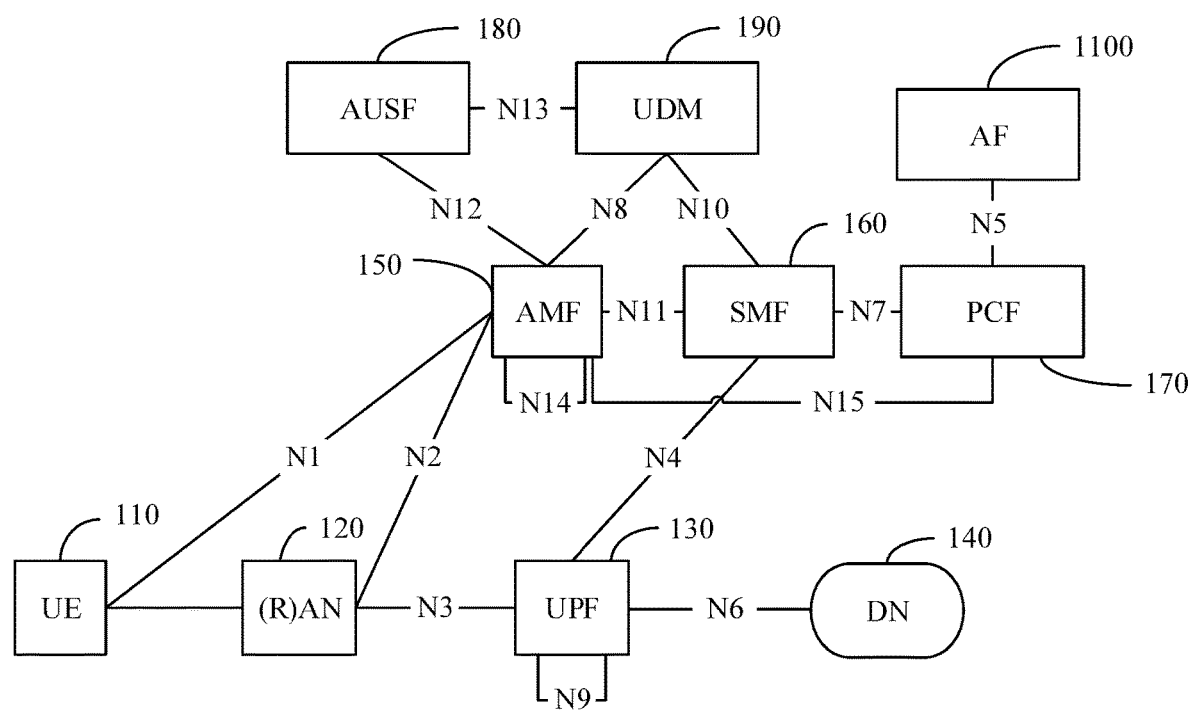
FIG. 1 shows a network architecture applicable to the embodiments of this application.

FIG. 1 shows a network architecture applicable to the embodiments of this application. As shown in FIG. 1, the following separately describes components in the network architecture.

1. UE 110: The UE 110 may include various handheld devices, vehicle-mounted devices, wearable devices, or computing devices that have a wireless communication function, or another processing device connected to a wireless modem, and various forms of terminals, mobile stations (MS), terminals, UE, soft clients, or the like. For example, the UE 110 may be a water meter, an electricity meter, or a sensor.

2. (Radio) access network ((R)AN) network element 120: The (R)AN network element 120 is configured to provide a network access function for authorized UE in a specific area, and can use transmission tunnels with different quality based on UE types, service requirements, and the like.

The (R)AN network element can manage radio resources and provide an access service for UE, to forward a control signal and UE data between the UE and a core network. The (R)AN network element may also be understood as a base station on a conventional network.

3. User plane network element 130: The user plane network element 130 is configured to perform packet routing and forwarding, quality of service (QoS) processing on user plane data, and the like.

In a 5G communications system, the user plane network element may be a user plane function (UPF). In a future communications system, the user plane network element may still be a UPF network element, or may have another name. This is not limited in this application.

4. Data network (DN) network element 140: The DN network element 140 is configured to provide a network for transmitting data.

In a 5G communications system, the DN network element may be a DN network element. In a future communications system, the data network element may still be a DN network element, or may have another name. This is not limited in this application.

5. Access management network element 150: The access management network element 150 is mainly configured to perform mobility management, access management, and the like, and may be configured to implement a function in functions of a Mobility Management Entity (MME) other than session management, for example, lawful interception and access authorization/authentication.

In a 5G communications system, the access management network element may be an AMF network element. In a future communications system, the access management network element may still be an AMF, or may have another name. This is not limited in this application.

6. Session management network element 160: The session management network element 160 is mainly configured to manage a session, allocate and manage an Internet Protocol (IP) address of UE, select an endpoint that can manage a UPF interface and a policy control and charging function interface, perform downlink data notification, and the like.

In a 5G communications system, the session management network element may be a session management function (SMF) network element. In a future communications system, the session management network element may still be an SMF network element, or may have another name. This is not limited in this application.

7. Policy control network element 170: The policy control network element 170 is configured to guide a unified policy framework for network behavior, provide policy rule information for a control plane function network element (such as an AMF or an SMF), and the like.

In a $4^{th}$ generation (4G) communications system, the policy control network element may be a policy and charging rules function (PCRF) network element. In a 5G communications system, the policy control network element may be a policy control function (PCF) network element. In a future communications system, the policy control network element may still be a PCF network element, or may have another name. This is not limited in this application.

8. Authentication server 180: The authentication server 180 is configured to authenticate a service and generate a key, to implement mutual authentication between the authentication server 180 and UE, and support a unified authentication framework.

In a 5G communications system, the authentication server may be an authentication server function (AUSF) network element. In a future communications system, the AUSF network element may still be an AUSF network element, or may have another name. This is not limited in this application.

9. Data management network element 190: The data management network element 190 is configured to process a UE identifier, access authentication, perform registration management and mobility management, and the like.

In a 5G communications system, the data management network element may be a unified data management (UDM) network element. In a 4G communications system, the data management network element may be a home subscriber server (HSS) network element. In a future communications system, the unified data management may still be a UDM network element, or may have another name. This is not limited in this application.

10. Application network element 1100: The application network element is configured to perform application-affected traffic routing, access a network exposure function network element, interact with a policy framework to perform policy control, and the like.

In a 5G communications system, the application network element may be an application function (AF) network element. In a future communications system, the application network element may still be an AF network element, or may have another name. This is not limited in this application.

11. Network storage network element: The network storage network element is configured to maintain real-time information of all network function services on a network.

In a 5G communications system, the network storage network element may be a network repository function (NRF) network element. In a future communications system, the network storage network element may still be an NRF network element, or may have another name. This is not limited in this application.

It may be understood that the foregoing network elements or functions may be network elements on a hardware device, software functions running on dedicated hardware, or virtualized functions instantiated on a platform (for example, a cloud platform). For ease of description, that the access management network element is an AMF, the data management network element is a UDM network element, the session management network element is an SMF network element, and the user plane network element is a UPF network element is used as an example for subsequent description in this application.

Further, the AMF network element is referred to as an AMF, the UDM network element is referred to as a UDM, the SMF network element is referred to as an SMF, and the UPF network element is referred to as a UPF. To be specific, in subsequent descriptions in this application, the AMF may be replaced by an access management network element, the UDM may be replaced by a data management network element, the SMF may be replaced by a session management network element, and the UPF may be replaced by a user plane network element.

For ease of description, in the embodiments of this application, that apparatuses are an AMF entity and a UDM entity is used an example to describe a session establishment method. For an implementation method in which the apparatuses are a chip in an AMF entity and a chip in a UDM entity, refer to specific descriptions of the case in which the apparatuses are the AMF entity and the UDM entity. Details are not repeated.

In the network architecture shown in FIG. 1, the UE is connected to the AMF through an N1 interface, the (R)AN is connected to the AMF through an N2 interface, and the (R)AN is connected to the UPF through an N3 interface, UPFs are connected to each other through an N9 interface, and the UPF is connected to the DN through an N6 interface, the SMF controls the UPF through an N4 interface, the AMF is connected to the SMF through an N11 interface, and the AMF obtains subscription data of the UE from the UDM through an N8 interface, and the SMF obtains the subscription data of the UE from the UDM unit through an N10 interface.

It should be understood that the foregoing network architecture applied to the embodiments of this application is merely an example for description, and a network architecture applicable to the embodiments of this application is not limited thereto. Any network architecture that can implement functions of the foregoing network elements is applicable to the embodiments of this application.

For example, in some network architectures, network function network element entities such as an AMF, an SMF network element, a PCF network element, a Bootstrapping Server Function (BSF) network element, and a UDM network element are all referred to as network function (NF) network elements. Alternatively, in some other network architectures, a set of network elements such as an AMF, an SMF network element, a PCF network element, a BSF network element, and a UDM network element may be referred to as a control plane function network element.

The technical solutions of the embodiments of this application may be applied to various communications systems, such as a Global System for Mobile communications (GSM) system, a code-division multiple access (CDMA) system, a wideband CDMA (WCDMA) system, a General Packet Radio Service (GPRS) system, a Long-Term Evolution (LTE) system, an LTE frequency-division duplex (FDD) system, an LTE time division duplex (TDD) system, a Universal Mobile Telecommunications System (UMTS), a Worldwide Interoperability for Microwave Access (WIMAX) communications system, a future 5G system, or a New Radio (NR) system.

UE in the embodiments of this application may be referred to as UE, an access terminal, a subscriber unit, a subscriber station, a mobile station, a mobile console, a remote station, a remote terminal, a mobile device, a user terminal, a terminal, a wireless communications device, a user agent, a user apparatus, or the like. The user device may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, a vehicle-mounted device, a wearable device, UE in a future 5G network, or UE in a future evolved public land mobile network (PLMN). This is not limited in the embodiments of this application.

A network device in the embodiments of this application may be a device configured to communicate with the UE. The network device may be a base transceiver station (BTS) in a GSM system or a CDMA system, or may be a NodeB (NB) in a WCDMA system, or may be an evolved NodeB (eNB or eNodeB) in an LTE system, or may be a radio controller in a cloud (R)AN (C(R)AN) scenario. Alternatively, the network device may be a relay station, an access point, a vehicle-mounted device, a wearable device, a network device in a future 5G network, a network device in a future evolved PLMN network, or the like. This is not limited in the embodiments of this application.

In the embodiments of this application, the UE or the network device includes a hardware layer, an operating system layer running on the hardware layer, and an application layer running on the operating system layer. The hardware layer includes hardware such as a central processing unit (CPU), a memory management unit (MMU), and a memory (also referred to as a main memory). The operating system may be any one or more computer operating systems, for example, a LINUX operating system, a UNIX operating system, an ANDROID operating system, an IOS operating system, or a WINDOWS operating system, that process a service through a process. The application layer includes applications such as a browser, contacts, word processing software, and instant messaging software. In addition, a specific structure of an execution body of a method provided in the embodiments of this application is not particularly limited in the embodiments of this application, provided that a program that records code of the method provided in the embodiments of this application can be run to perform communication according to the method provided in the embodiments of this application. For example, the execution body of the method provided in the embodiments of this application may be the UE or the network device, or a functional module that is in the UE or the network device and that can invoke and execute the program.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to a magnetic storage component (for example, a hard disk, a FLOPPY DISK, or a magnetic tape), an optical disc (for example, a compact disc (CD), a digital versatile disc (DVD), a smart card, and a flash memory component (for example, an erasable programmable read-only memory (ROM) (EPROM), a card, a stick, or a key drive). In addition, various storage media described in this specification may indicate one or more devices and/or other machine-readable media that are configured to store information. The term "machine-readable media" may include but are not limited to a radio channel, and various other media that can store, include, and/or carry an instruction and/or data.

The embodiments of this application mainly involve the AMF, the UE, and the (R)AN in the network architecture shown in FIG. 1. The AMFs in this application include a first AMF (a source AMF) and a second AMF (a target AMF). The (R)AN network elements in this application include a first (R)AN (a source (R)AN) network element and a second (R)AN (a target (R)AN) network element.

Further, the first AMF in this application is an AMF that provides a core network service for the UE before a handover. The second AMF in this application is an AMF that is selected to provide a core network service for the UE after the handover. The first (R)AN network element in this application is an (R)AN network element that provides an access network service for the UE before the handover from the first AMF. The second (R)AN network element in this application is an (R)AN network element that is selected to provide an access network service for the UE after the handover to the second AMF. Further, this application may involve an AUSF/UDM, and the AUSF/UDM is mainly configured to perform authentication, for example, implement authentication between the UE and the network device. It should be understood that a handover procedure is mainly discussed in this application, an authentication procedure is not limited in this application, and the following does not describe authentication between the UE and the network device.

Further, in the embodiments of this application, for ease of description, the first (R)AN network element may be referred to as a first (R)AN, and the second (R)AN network element may be referred to as a second (R)AN. A handover in the embodiments of this application means that a (R)AN network element that provides an access network service for the UE changes from the first (R)AN to the second (R)AN. The first (R)AN cannot directly establish a connection to the second (R)AN for signaling exchange. If the first (R)AN is managed by the first AMF, and the second (R)AN is managed by the second AMF, in a process in which the (R)AN network element that provides the access network service for the UE changes from the first (R)AN to the second (R)AN, related signaling needs to be transferred through the first AMF and the second AMF. When the (R)AN network element that provides the access network service for the UE fails to change from the first (R)AN to the second (R)AN, the first (R)AN usually continues to provide the access network service for the UE. In this application, that the (R)AN network element that provides the access network service for the UE changes from the first (R)AN to the second (R)AN is referred to as a handover, and that the (R)AN network element that provides the access network service for the UE fails to change from the first (R)AN to the second (R)AN is referred to as a handover failure.

Further, before the handover, after the authentication between the UE and the network device is completed, the UE and the first AMF obtain a same AMF key. In the embodiments of this application, for ease of description, the AMF key obtained by the UE and the first AMF is denoted as Kamf, and the Kamf may also be referred to as a first AMF key or Kamf 1. Then, the UE and the first AMF each generate, based on the Kamf and a NAS integrity protection algorithm negotiated between the UE and the first AMF, an integrity protection key used for NAS message protection, and the UE and the first AMF each generate, based on the Kamf and a NAS confidentiality protection algorithm negotiated between the UE and the first AMF, a confidentiality protection key used for NAS message protection, where the integrity protection key used for NAS message protection and the confidentiality protection key used for NAS message protection may be collectively referred to as a NAS key. In the embodiments of this application, for ease of description, the integrity protection keys generated by the UE and the first AMF and used for NAS message protection are collectively denoted as Knasint, the confidentiality protection keys generated by the UE and the first AMF and used for NAS message protection are collectively denoted as Knasenc, the integrity protection keys generated by the UE and the first AMF based on the Kamf and the NAS integrity protection algorithm negotiated between the UE and the first AMF and used for NAS message protection and the confidentiality protection keys generated by the UE and the first AMF based on the Kamf and the NAS confidentiality protection algorithm negotiated between the UE and the first AMF and used for NAS message protection may be collectively referred to as a first NAS key, and the NAS integrity protection algorithm and the NAS confidentiality protection algorithm that are negotiated between the UE and the first AMF may be collectively referred to as a first NAS security algorithm.

It should be understood that manners to be used by the UE and the first AMF to negotiate the NAS integrity protection algorithm and the NAS confidentiality protection algorithm are not limited in this application, and a negotiation solution specified in an existing protocol may be used.

To ensure service continuity during the handover, when the handover occurs, the first AMF transfers a UE security context used between the first AMF and the UE to the second AMF. The UE security context includes the Kamf or Kamf' (which may also be referred to as Kamf 2 or a second AMF key) obtained after key derivation is performed on the Kamf, the first NAS security algorithm negotiated between the first AMF and the UE, a downlink (DL) NAS count, a NAS security algorithm list supported by the UE, and the like. It should be understood that transferring, by the first AMF, the UE security context used between the first AMF and the UE to the second AMF is a step specified in a handover procedure in the existing protocol. No improvement is made to the step in this application. In other words, for content included in the step of sending, by the first AMF, the UE security context to the second AMF, refer to content specified in the existing protocol, and only a brief description is provided herein.

The second AMF generates a third NAS security context based on the AMF key included in the UE security context transferred by the first AMF and a second NAS security algorithm negotiated between the second AMF and the UE. The third NAS security context includes Kamf 2, Knasint 2, Knasenc 2, a DL NAS count 2, and the like. Further, that the second AMF negotiates the second NAS security algorithm with the UE includes that the second AMF selects a second NAS security algorithm from the NAS security algorithm list supported by the UE and included in the UE security context received from the first AMF, and generates the new NAS security context based on the selected second NAS security algorithm and the key Kamf or Kamf' included in the received UE security context. Unless otherwise specified, the second NAS security algorithm in this application is different from the first NAS security algorithm.

It should be understood that, similar to the first NAS security algorithm, the second NAS security algorithms include a second NAS integrity protection algorithm and a second NAS confidentiality protection algorithm. The NAS integrity protection algorithm is used to generate a second integrity protection key, and the NAS confidentiality protection algorithm is used to generate a second confidentiality protection key.

Further, it can be learned from the foregoing description that the UE security context sent by the first AMF to the second AMF includes the following two possible forms:

Form 1: The first AMF does not perform the derivation on the Kamf. The UE security context includes the Kamf, the DL NAS count, the first NAS security algorithm negotiated between the first AMF and the UE, and the NAS security algorithm list supported by the UE.

Form 2: The first AMF performs the key derivation on the Kamf, to generate the second AMF key Kamf'. The UE security context includes the Kamf', the DL NAS count, the first NAS security algorithm negotiated between the first AMF and the UE, the NAS security algorithm list supported by the UE, and derivation indication information. The derivation indication information is used to indicate that the first AMF performs horizontal derivation on the AMF key.

In Form 2, before the first AMF transfers the security context used between the first AMF and the UE to the second AMF, the first AMF performs the key derivation on the Kamf according to a local policy of the first AMF, to generate the key Kamf' after the key derivation. It should be understood that, in the embodiments of this application, a key derivation mechanism and parameter used to perform the key derivation on the key to generate the second key are not limited, and only that the key on which the derivation is performed cannot be obtained by performing key derivation on the generated second key is limited. In other words, the second key is isolated from the key on which the derivation is performed.

In a possible implementation, the key derivation in this application may be horizontal key derivation defined in the existing protocol.

For example, a manner of performing the horizontal key derivation on the Kamf to generate the Kamf' is as follows:

Kamf'=HMAC-SHA-256 (Key, S);
FC=0x72;
P0=0x01;
L0=length of P0 (i.e. 0x00 0x01);
P1=DL NAS count;
L1=length of P1 (i.e. 0x00 0x04);
KEY=Kamf;
S=FC∥P0∥L0∥P1∥L1.

In another possible implementation, the key derivation in this application may be a key derivation manner agreed on between different network elements. For example, the first AMF and the second AMF agree on a preset key derivation manner. Provided that the UE security context sent by the first AMF to the second AMF includes the derivation indication information, the second AMF can determine that a key in the received UE security context is obtained by the first AMF by performing the key derivation in the preset key derivation manner.

Further, it can be learned from the foregoing description that the new NAS security context generated by the second AMF based on the UE security context transferred by the first AMF and the second NAS security algorithm negotiated between the second AMF and the UE includes the following two possible forms:

Form 1: This form corresponds to the foregoing Form 1 in which the first AMF does not perform the derivation on the Kamf. The new NAS security context includes the Kamf 2, the Knasint 2, the Knasenc 2, and the DL NAS count 2, where the Kamf 2 is the Kamf.

In a possible implementation, if the NAS integrity protection algorithm and the NAS confidentiality protection algorithm that are negotiated between the second AMF and the UE are the same as the NAS integrity protection algorithm and the NAS confidentiality protection algorithm that are negotiated between the first AMF and the UE, the second AMF generates, based on the Kamf and the NAS integrity protection algorithm and the NAS confidentiality protection algorithm that are negotiated between the UE and the second AMF, the integrity protection key Knasint 2 used for NAS message protection and the confidentiality protection key Knasenc 2 used for NAS message protection, where the Knasint 2 and the Knasenc 2 are the foregoing Knasint and Knasenc.

In another possible implementation, if the NAS integrity protection algorithm and the NAS confidentiality protection algorithm that are negotiated between the second AMF and the UE are different from the NAS integrity protection algorithm and the NAS confidentiality protection algorithm that are negotiated between the first AMF and the UE, the second AMF generates, based on the Kamf and the NAS integrity protection algorithm and the NAS confidentiality protection algorithm that are negotiated between the UE and the second AMF, the integrity protection key Knasint 2 used for NAS message protection and the confidentiality protection key Knasenc 2 used for NAS message protection, where the Knasint 2 and the Knasenc 2 are different from the foregoing Knasint and Knasenc.

Form 2: This form corresponds to the foregoing Form 2 in which the first AMF performs the derivation on the Kamf. The new NAS security context includes the Kamf', the Knasint 2, the Knasenc 2, the DL NAS count, and derivation indication information. The derivation indication information is used to indicate that the Kamf' is a derived AMF key.

The Knasint 2 and the Knasenc 2 are respectively the integrity protection key used for NAS message protection and the confidentiality protection key used for NAS message protection that are generated by the second AMF based on the Kamf' and the NAS integrity protection algorithm and the NAS confidentiality protection algorithm that are negotiated between the UE and the second AMF.

In Form 2, the second AMF receives the derivation indication information, and further sends the derivation indication information to the UE. The derivation indication information is used to indicate the UE to perform the derivation on the Kamf such that the Kamf' on the UE side is the same as that on a network side.

It should be understood that, after receiving the Kamf or the Kamf' sent by the first AMF, the second AMF generates NAS keys (the Knasenc 2 and the Knasint) used between the second AMF and the UE, based on NAS security algorithms (including the integrity protection algorithm and the confidentiality protection algorithm) selected by the second AMF and the received Kamf or Kamf' and in combination with algorithm negotiation between the second AMF and the UE. The UE side also performs same calculation. Finally, the AMF key and the NAS key on the UE side are the same as those on the second AMF side.

When the handover fails, it can be ensured that the AMF key and the NAS key on the UE are the same as those on the second AMF, but it cannot be ensured that the NAS key on the UE is the same as that on the first AMF when the handover fails. The following separately and briefly describes, with reference to FIG. 2 and FIG. 3, a case in which an AMF key and a NAS key on the UE are different from those on the first AMF when the first AMF performs derivation on a Kamf in a handover failure process and when a NAS security algorithm supported by the first AMF is different from a NAS security algorithm supported by the second AMF, and a case in which an AMF key and a NAS key on the UE are different from those on the first AMF when the first AMF does not perform derivation on a Kamf in a handover failure process and when a NAS security algorithm supported by the first AMF is different from a NAS security algorithm supported by the second AMF.

Figure 2:
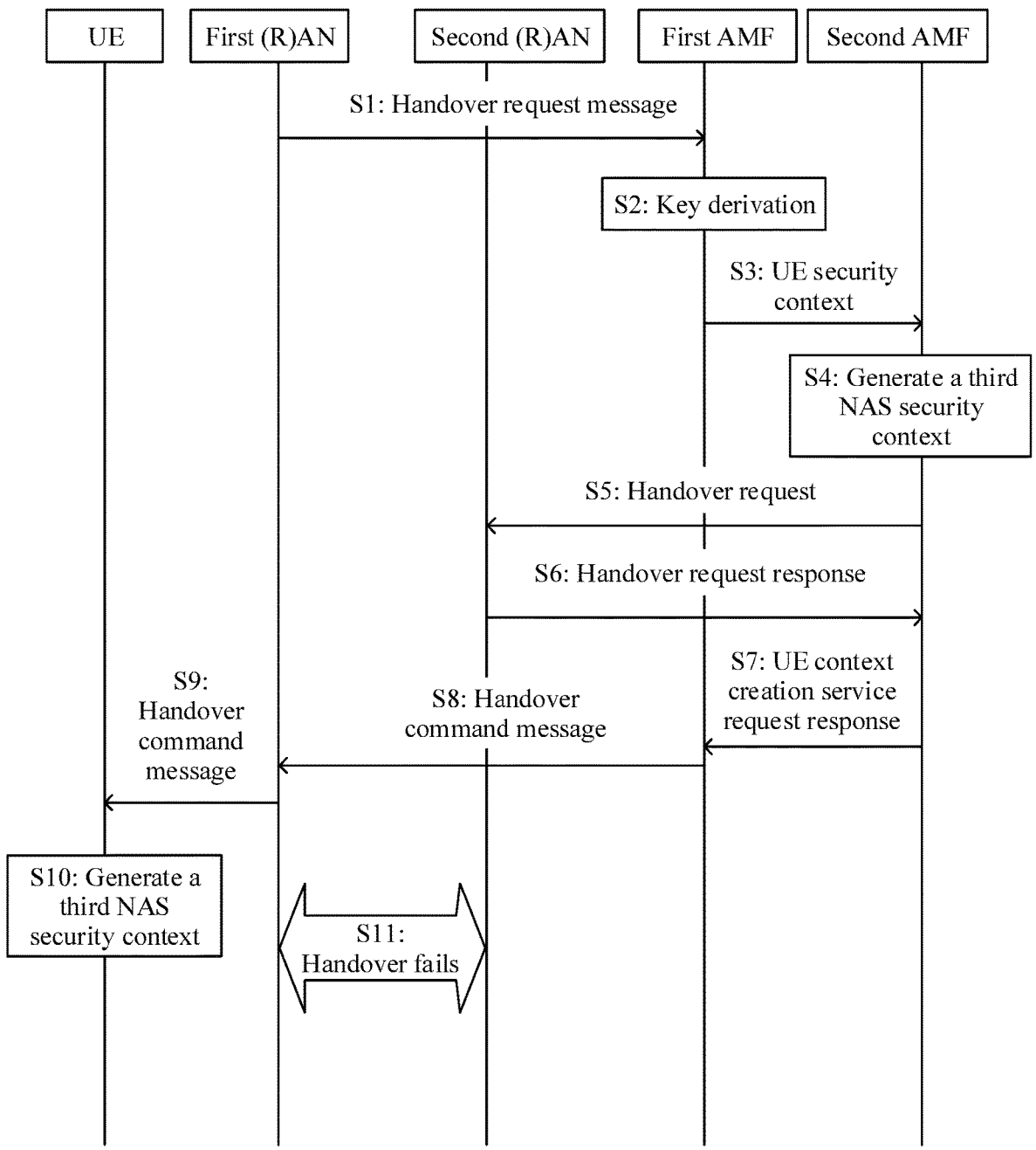
FIG. 2 is a schematic diagram of a handover failure procedure.

FIG. 2 is a schematic diagram of a handover failure procedure. UE, a first AMF, a second AMF, a first (R)AN, a second (R)AN, and S1 to S11 are included. The following describes in detail a method procedure shown in FIG. 2.

Before a handover occurs, an AMF key and NAS keys on the UE and the first AMF are Kamf, Knasenc, and Knasint, and a DL NAS count is equal to X.

S1: The first (R)AN sends a handover request message to the first AMF.

The handover request message is used to indicate that an access network device handover is required. The handover request message may be referred to as handover required. It should be understood that no improvement is made to the handover request message sent by the first (R)AN to the first AMF in this application. For details, refer to a handover request message specified in an existing protocol.

S2: The first AMF performs key derivation.

In the handover failure procedure shown in FIG. 2, after receiving the handover request message sent by the first (R)AN, the first AMF determines that the access network device handover is required. The first AMF performs the key derivation on a local first AMF key Kamf to obtain a second AMF key Kamf'.

It should be understood that after the first AMF performs S2, an AMF key and NAS keys on the first AMF are the Kamf', Knasenc, and Knasint.

S3: The first AMF sends a UE security context to the second AMF.

The UE security context includes the Kamf', the Knasenc, the Knasint, and a DL NAS count (where the DL NAS count is equal to X+1). The sending, by the first AMF, a UE security context to the second AMF may be initiating, by the first AMF, a UE context creation service request to the second AMF, where the UE context creation service request may be referred to as create UE context request. It should be understood that no improvement is made to the step of sending, by the first AMF, the UE security context to the second AMF in this application. For details, refer to a step, specified in the existing protocol, of sending, by a first AMF, a UE security context to a second AMF.

S4: The second AMF generates a new NAS security context.

The new NAS security context includes the Kamf' received by the second AMF, NAS Keys (Knasenc 2 and Knasint 2) that are used between the second AMF and the UE and that are generated by the second AMF based on a second NAS security algorithm negotiated between the second AMF and the UE, and a DL NAS count (where the DL NAS count is equal to 0), and the Knasenc 2 and the Knasint 2 are different from the Knasenc and the Knasint.

S5: The second AMF sends a handover request to the second (R)AN.

The handover request is used to obtain related information of the second (R)AN. The handover request may be referred to as handover request. It should be understood that no improvement is made to the step of sending, by the second AMF, the handover request to the second (R)AN in this application. For details, refer to a step, specified in the existing protocol, of sending, by a second AMF, a handover request to a second (R)AN.

S6: The second (R)AN sends a handover request response to the second AMF.

The handover request response is used to notify the second AMF of the related information of the second (R)AN. The handover request response may be referred to as handover request acknowledge. It should be understood that no improvement is made to the step of sending, by the second (R)AN, the handover request response to the second AMF in this application. For details, refer to a step, specified in the existing protocol, of sending, by a second (R)AN, a handover request response to a second AMF.

S7: The second AMF sends a UE context creation service request response to the first AMF.

The UE context creation service request response is used to notify the first AMF of the related information of the second (R)AN. The UE context creation service request response may be referred to as create UE context response. It should be understood that no improvement is made to the step of sending, by the second AMF, the UE context creation service request response to the first AMF in this application. For details, refer to a step, specified in the existing protocol, of sending, by a second AMF, a UE context creation service request response to a first AMF.

S8: The first AMF sends a handover command message to the first (R)AN.

The handover command message is used to notify the first (R)AN of the related information of the second (R)AN. The handover command message may be referred to as handover command. It should be understood that no improvement is made to the step of sending, by the first AMF, the handover command message to the first (R)AN in this application. For details, refer to a step, specified in the existing protocol, of sending, by a first AMF, a handover command message to a first (R)AN.

S9: The first (R)AN sends a handover command message to the UE.

The handover command message is used to notify the UE of the related information of the second (R)AN. The handover command message may be referred to as handover command. It should be understood that no improvement is made to the step of sending, by the first (R)AN, the handover command message to the UE in this application. For details, refer to a step, specified in the existing protocol, of sending, by a first (R)AN, a handover command message to UE.

S10: The UE generates a new NAS security context.

The new NAS security context includes the Kamf', the NAS keys (Knasenc 2 and Knasint 2) that are used between the second AMF and the UE and that are generated by the UE based on the second NAS security algorithm negotiated between the second AMF and the UE, and a DL NAS count (where the DL NAS count is equal to 0).

After the UE performs S10, an AMF key and NAS keys on the UE are the Kamf', the Knasenc 2, and the Knasint 2.

When the UE fails to be handed over for some reasons (for example, a signal of the second (R)AN deteriorates, or an integrity check performed by the UE on a received NASC fails), S11 occurs, that is, the handover fails. In this case, the UE continues to be served by the first AMF. However, when the first AMF performs the derivation on the Kamf during the handover, because the NAS keys on the UE are different from the NAS keys on the first AMF, the UE and the first AMF cannot perform NAS message security protection subsequently.

Figure 3:
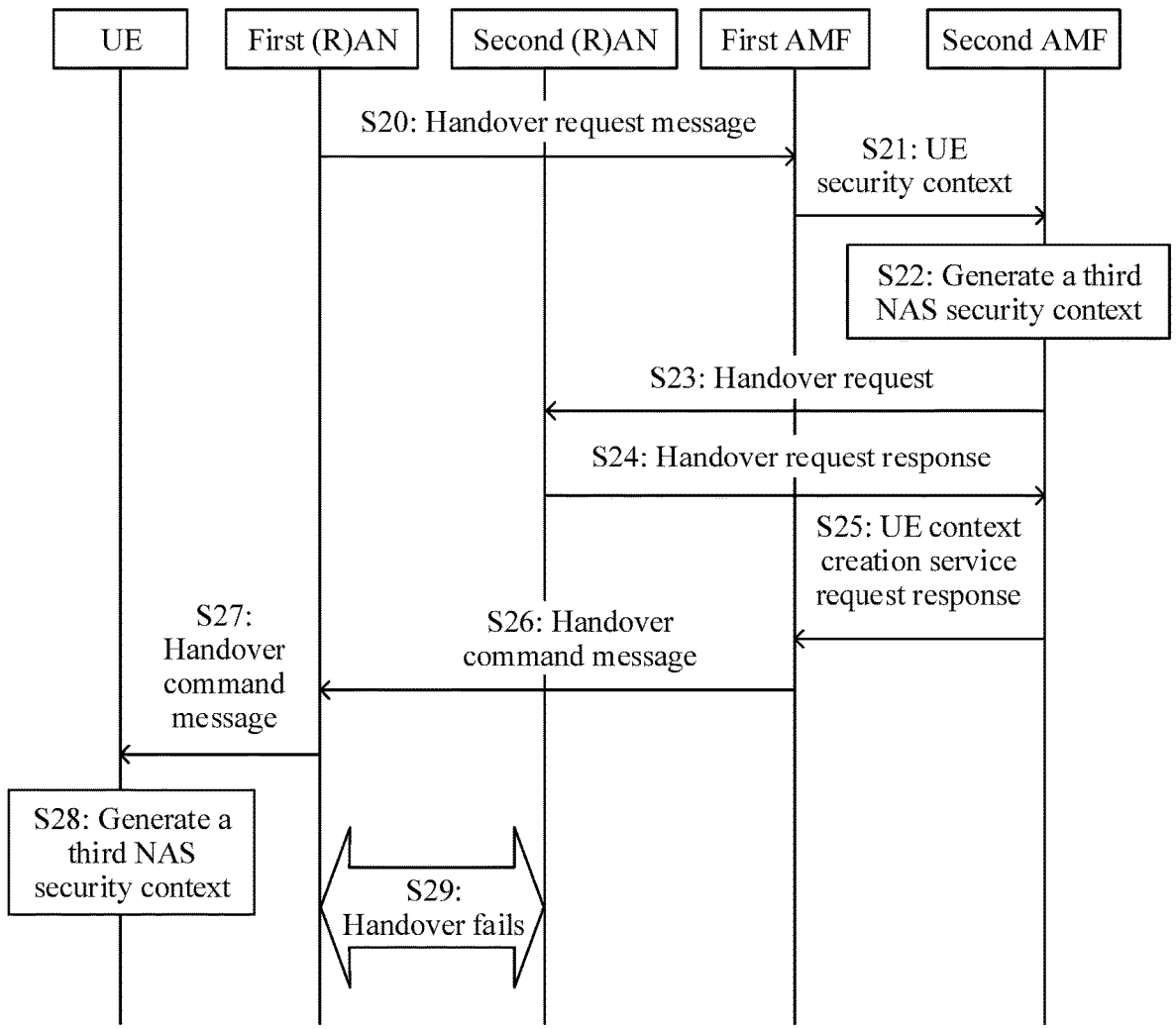
FIG. 3 is a schematic diagram of another handover failure procedure.

FIG. 3 is a schematic diagram of another handover failure procedure. UE, a first AMF, a second AMF, a first (R)AN, a second (R)AN, and S20 to S29 are included. The following describes in detail a method procedure shown in FIG. 3.

Before a handover occurs, an AMF key and NAS keys on the UE and the first AMF are Kamf, Knasenc, and Knasint, and a DL NAS count is equal to X.

S20: The first (R)AN sends a handover request message to the first AMF.

The handover request message is used to indicate that the handover is required. This step is similar to the step of sending, by the first (R)AN, a handover request message to the first AMF shown in FIG. 2. Therefore, details are not described herein again.

S21: The first AMF sends a UE security context to the second AMF.

The UE security context includes the Kamf, the Knasenc, the Knasint, and a DL NAS count (where the DL NAS count is equal to X+1).

S22: The second AMF determines a new NAS security context.

The new NAS security context includes the Kamf received by the second AMF, NAS Keys (Knasenc 2 and Knasint 2) that are used between the second AMF and the UE and that are generated by the second AMF based on a second NAS security algorithm negotiated between the second AMF and the UE, and a DL NAS count (where the DL NAS count is equal to X+1), and the Knasenc 2 and the Knasint 2 are different from the Knasenc and the Knasint.

S23: The second AMF sends a handover request to the second (R)AN.

The handover request is used to obtain related information of the second (R)AN.

S24: The second (R)AN sends a handover request response to the second AMF.

The handover request response is used to notify the second AMF of the related information of the second (R)AN.

S25: The second AMF sends a UE context creation service request response to the first AMF.

The UE context creation service request response is used to notify the first AMF of the related information of the second (R)AN.

S26: The first AMF sends a handover command message to the first (R)AN.

The handover command message is used to notify the first (R)AN of the related information of the second (R)AN.

S27: The first (R)AN sends a handover command message to the UE.

The handover command message is used to notify the UE of the related information of the second (R)AN.

S28: The UE generates a new NAS security context.

The new NAS security context includes the Kamf, the NAS keys (Knasenc 2 and Knasint 2) that are used between the second AMF and the UE and that are generated by the UE based on the second NAS security algorithm negotiated between the second AMF and the UE, and a DL NAS count (where the DL NAS count is equal to X+1).

After the UE performs S28, an AMF key and NAS keys on the UE are the Kamf, the Knasenc 2, and the Knasint 2.

When the UE fails to be handed over for some reasons (for example, a signal of the second (R)AN deteriorates), S29 occurs, that is, the handover fails. In this case, the UE continues to be served by the first AMF. However, when the second (R)AN selects the second NAS security algorithm different from the foregoing first NAS security algorithm during the handover, the Knasenc 2 and the Knasint 2 that are generated by the UE based on the Kamf and the second NAS security algorithm are different from the Knasenc and the Knasint. In this case, the NAS keys on the UE are different from the NAS keys on the first AMF, and therefore the UE and the first AMF cannot perform NAS message security protection subsequently.

To avoid a case in which a NAS key on the UE is different from a NAS key on the first AMF in the method procedures shown in FIG. 2 and FIG. 3, this application proposes a handover handling method, to ensure that a NAS security context used by UE is the same as a NAS security context used by a first AMF such that a NAS key on the UE is the same as a NAS key on the first AMF. The following describes in detail handover handling methods provided in the embodiments of this application with reference to FIG. 4 and FIG. 5.

Figure 4:
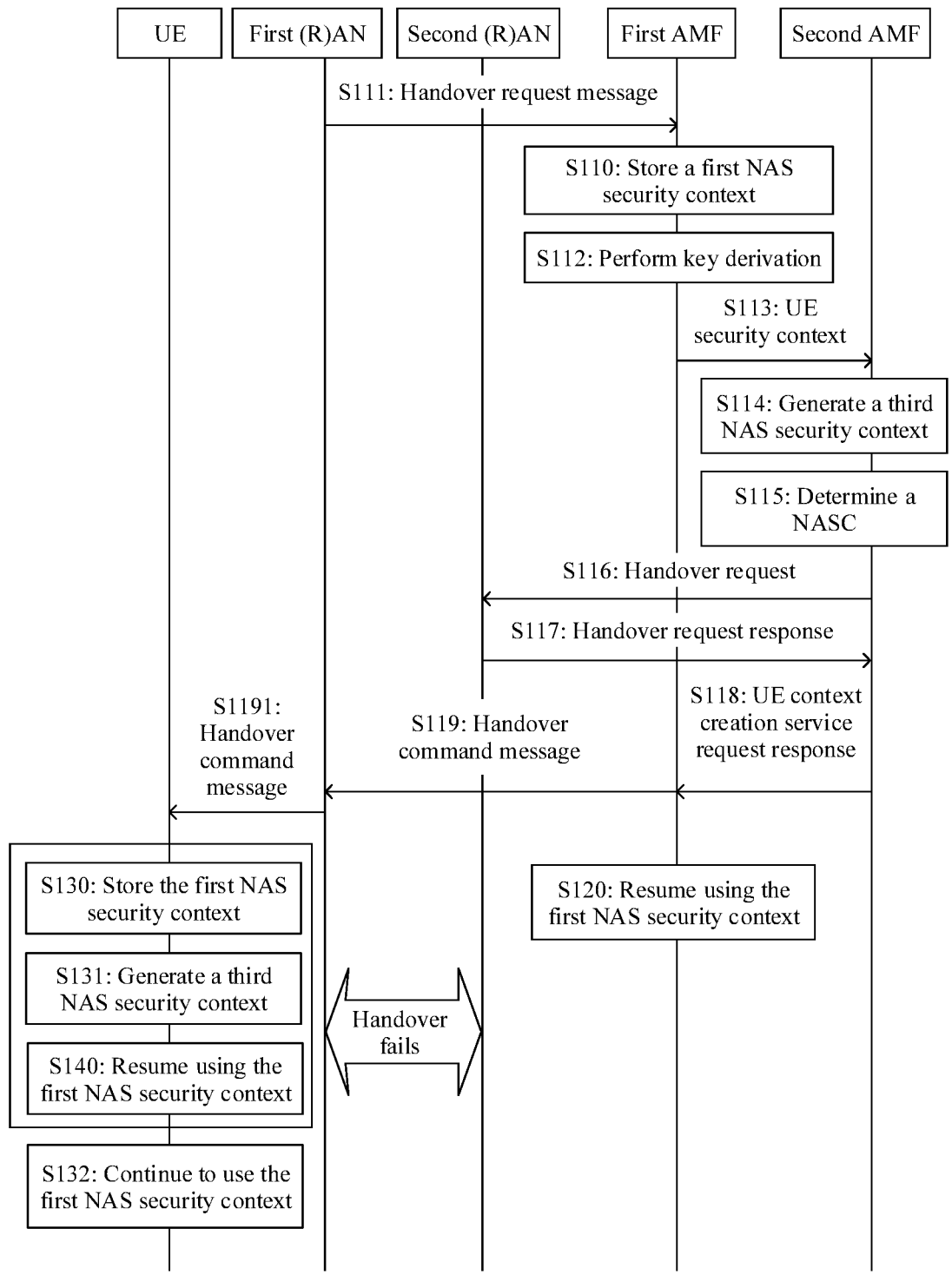
FIG. 4 is a schematic flowchart of a handover handling method according to an embodiment of this application.

FIG. 4 is a schematic flowchart of a handover handling method according to an embodiment of this application. The schematic flowchart includes UE, a first AMF, a second AMF, a first (R)AN, a second (R)AN, and S110 to S140. The following describes in detail a method procedure shown in FIG. 4.

Before a handover, a NAS security context on the UE and a NAS security context on the first AMF each include Kamf (a first AMF key Kamf 1), Knasenc, Knasint (where the Knasenc and the Knasint are collectively referred to as a first NAS key), a DL NAS count (a first NAS count, where the DL NAS count is equal to X), a NAS security algorithm (a first NAS security algorithm) negotiated between the UE and the first AMF, and the like. In the embodiment shown in FIG. 4, the NAS security contexts on the UE and the first AMF before the handover are collectively referred to as a first NAS security context.

S110: The first AMF determines that key derivation needs to be performed, and stores the first NAS security context.

In a possible implementation, the first AMF stores the first NAS security context before performing the key derivation.

In a possible implementation, the first AMF stores the first NAS security context after performing the key derivation.

In this application, a sequence of performing the key derivation by the first AMF and storing the first NAS security context by the first AMF is not strictly limited. Further, before the first AMF performs S110, the embodiment shown in FIG. 4 further includes S111 The first (R)AN sends a handover request message to the first AMF. In the embodiment shown in FIG. 4, the step of sending, by the first (R)AN, a handover request message to the first AMF is similar to S1 in FIG. 2. Therefore, details are not described herein again.

Further, in the embodiment shown in FIG. 4, after receiving the handover request message, that the first AMF stores the first NAS security context includes the following two possible cases.

In a possible case 1, if the first AMF does not perform the key derivation on the key Kamf included in the first NAS security context, the first AMF determines to store the first NAS security context. This is consistent with an existing procedure shown in FIG. 3.

In a possible case 2, the first AMF determines, according to a local policy, that the key derivation needs to be performed on the key Kamf included in the first NAS security context. The embodiment shown in FIG. 4 further includes S112 The first AMF performs the key derivation.

Further, after the first AMF stores the first NAS security context, the first AMF performs the key derivation on the first key Kamf, to obtain a second key Kamf'. It should be understood that a process of performing key derivation by the first AMF is not limited in this embodiment of this application, and may be a process, specified in an existing protocol, of performing key derivation by a first AMF. The first AMF performs the key derivation to generate the derived Kamf', which is referred to as a second key in the embodiment shown in FIG. 4. In the embodiment shown in FIG. 4, the possible case 2 in which a procedure is inconsistent with the existing procedure is mainly described, and the possible case 1 in which a procedure is consistent with the existing procedure is briefly described.

S113: The first AMF sends a UE security context to the second AMF.

Further, the step of sending, by the first AMF, a UE security context to the second AMF may be initiating, by the first AMF, a UE context creation service request to the second AMF. Based on the possible case 1 and the possible case 2 in S110, that the first AMF sends the UE security context to the second AMF also includes the following two possible cases.

In a possible case 1, if the first AMF does not perform the key derivation on the first key Kamf included in the first NAS security context, the UE security context sent by the first AMF to the second AMF includes the Kamf, a DL NAS count (where the DL NAS count is equal to X+1), the NAS security algorithm negotiated between the UE and the first AMF, and a NAS security algorithm list supported by the UE.

In a possible case 2, if the first AMF performs the key derivation on the first key Kamf included in the first NAS security context, the UE security context sent by the first AMF to the second AMF includes Kamf', a DL NAS count (where the DL NAS count is equal to X+1), the NAS security algorithm negotiated between the UE and the first AMF, a NAS security algorithm list supported by the UE, and a key derivation indication. The key derivation indication is used to indicate that a key in the UE security context sent by the first AMF to the second AMF is obtained through the key derivation by the first AMF. The key derivation indication may be referred to as K_AMF_change_flag. Further, when a value of the K_AMF_change_flag is 1, it indicates that the key in the UE security context sent by the first AMF to the second AMF is obtained through the key derivation by the first AMF.

In the embodiment shown in FIG. 4, after receiving the UE security context sent by the first AMF, the second AMF performs the following step.

S114: The second AMF generates a third NAS security context. Based on the possible case 1 and the possible case 2 in S113, that the second AMF generates the third NAS security context also includes the following two possible cases.

In a possible case 1, the key included in the UE security context sent by the first AMF to the second AMF is the Kamf.

The second AMF generates, based on the key Kamf in the UE security context sent by the first AMF and a NAS security algorithm selected from the NAS security algorithm list supported by the UE, an integrity protection key Knasint 2 and a confidentiality protection key Knasenc 2 that are used for NAS message protection. The third NAS security context generated by the second AMF includes the Kamf, the Knasint 2, the Knasenc 2, a DL NAS count (where the DL NAS count is equal to X+1), and a NAS security algorithm negotiated between the UE and the second AMF.

In a possible implementation, if a NAS security algorithm selected by the second AMF from the NAS security algorithm list supported by the UE is the same as the NAS security algorithm negotiated between the UE and the first AMF, the Knasint 2 and the Knasenc 2 are the same as the Knasint and the Knasenc. In this implementation, a case in which an AMF key and a NAS key on the UE are different from those on the first AMF when the handover fails does not occur.

In another possible implementation, if a NAS security algorithm selected by the second AMF from the NAS security algorithm list supported by the UE is different from the NAS security algorithm negotiated between the UE and the first AMF, the Knasint 2 and the Knasenc 2 are different from the Knasint and the Knasenc. In this implementation, a case, shown in FIG. 3, in which a NAS key on the UE is different from a NAS key on the first AMF occurs.

In a possible case 2, the key included in the UE security context sent by the first AMF to the second AMF is the Kamf'.

The second AMF generates, based on the key Kamf' in the UE security context sent by the first AMF and a NAS security algorithm selected from the NAS security algorithm list supported by the UE, an integrity protection key Knasint 2 and a confidentiality protection key Knasenc 2 that are used for NAS message protection. The third NAS security context generated by the second AMF includes the Kamf', the Knasint 2, the Knasenc 2, a DL NAS count (where the DL NAS count is equal to X+1) or a DL NAS count (where the DL NAS count is equal to 0), a NAS security algorithm negotiated between the UE and the second AMF, and the key derivation indication.

In a possible implementation, if a NAS security algorithm selected by the second AMF from the NAS security algorithm list supported by the UE is the same as the NAS security algorithm negotiated between the UE and the first AMF, because the keys are different, the Knasint 2 and the Knasenc 2 are different from the Knasint and the Knasenc. In this implementation, a case, shown in FIG. 2, in which an AMF key and a NAS key on the UE are different from those on the first AMF occurs.

In another possible implementation, if a NAS security algorithm selected by the second AMF from the NAS security algorithm list supported by the UE is different from the NAS security algorithm negotiated between the UE and the first AMF, because both the keys and the NAS security algorithms are different, the Knasint 2 and the Knasenc 2 are different from the Knasint and the Knasenc. In this implementation, a case, shown in FIG. 2, in which an AMF key and a NAS key on the UE are different from those on the first AMF occurs.

Further, after generating the third NAS security context, the second AMF determines a NASC based on the third NAS security context. In other words, the embodiment shown in FIG. 4 further includes the following step.

S115: The second AMF determines the NASC. Based on the possible case 1 and the possible case 2 in S114, that the second AMF determines the NASC also includes the following two possible cases.

In a possible case 1, the third NAS security context includes the Kamf', the Knasint 2, the Knasenc 2, a DL NAS count (where the DL NAS count is equal to X+1), and the NAS security algorithm negotiated between the UE and the second AMF. In this case, the NASC includes the count (where the count is equal to X+1) and the NAS security algorithm negotiated between the UE and the second AMF.

In a possible case 2, the third NAS security context includes the Kamf', the Knasint 2, the Knasenc 2, a DL NAS count (where the DL NAS count is equal to X+1) or a DL NAS count (where the DL NAS count is equal to 0), the NAS security algorithm negotiated between the UE and the second AMF, and the key derivation indication. In this case, the NASC includes the DL NAS count (where the DL NAS count is equal to X+1) or the DL NAS count (where the DL NAS count is equal to 0), the NAS security algorithm negotiated between the UE and the second AMF, and the key derivation indication.

It should be understood that the second AMF needs to send the NASC to the UE. Further, the NASC needs to be sent to the UE through forwarding by the second (R)AN, the first AMF, and the first (R)AN. A manner of sending the NASC to the UE is not limited in this embodiment of this application. For details, refer to a manner specified in the existing protocol. For example, the embodiment shown in FIG. 4 further includes the following steps.

S116: The second AMF sends a handover request to the second (R)AN.

The handover request is used to obtain related information of the second (R)AN.

S117: The second (R)AN sends a handover request response to the second AMF.

The handover request response is used to notify the second AMF of the related information of the second (R)AN.

S118: The second AMF sends a UE context creation service request response to the first AMF.

The UE context creation service request response carries the NASC.

S119: The first AMF sends a handover command message to the first (R)AN.

The handover command message carries the NASC.

S1191: The first (R)AN sends a handover command message to the UE.

The handover command message carries the NASC.

Optionally, the embodiment shown in FIG. 4 further includes the following step.

S120: The first AMF resumes using the first NAS security context.

In a possible implementation, after the first AMF receives the handover request message shown in S110, based on the possible case 2 in S110, the first AMF performs the key derivation. The first AMF deletes the second Kamf' at any moment after the first AMF sends, to the second AMF, the UE context that includes the horizontally derived Kamf', and resumes using the first NAS security context.

In another possible implementation, after the first AMF performs S110, that is, stores the first NAS security context and performs the key derivation to generate a fourth NAS security context, the first AMF sets a flag bit to differentiate the first NAS security context from the fourth NAS security context. In other words, the first AMF may resume using the first NAS security context before or when sending the UE context to the second AMF.

S130: The UE stores the first NAS security context.

After the UE receives the handover command message sent by the first (R)AN and obtains the NASC, the UE performs integrity verification on the NASC. After the integrity verification performed on the NASC succeeds, if the NAS security algorithm that is negotiated between the UE and the second AMF and included in the NASC is different from the NAS security algorithm negotiated between the UE and the first AMF, and/or the NASC carries the K_AMF_change_flag with the value of 1, the UE stores the first NAS security context. The K_AMF_change_flag may be referred to as an AMF key change indication or a key derivation indication.

After storing the first NAS security context, the UE updates the first NAS security context based on information in the NASC to obtain a third NAS security context, that is, performs S131.

S140: The UE resumes using the first NAS security context.

When the UE finds that the handover fails, the UE resumes using the first NAS security context stored in S130.

Optionally, the UE deletes the third NAS security context.

In another possible implementation, the UE does not perform S130, S131, and S140. Instead, the UE performs the following step.

S132: The UE continues to use the first NAS security context.

After the UE receives the handover command message sent by the first (R)AN and obtains the NASC, the UE performs integrity verification on the NASC. After the integrity verification performed on the NASC fails, the UE continues to use the currently used first NAS security context.

The NAS security context in this embodiment of this application mainly includes a key identifier ngKSI, an AMF key, a NAS Key, a DL NAS count, a UL NAS count, a NAS security algorithm, and the like. The key identifier is used to indicate the AMF key, and the DL NAS count and the UL NAS count are a downlink NAS count and an uplink NAS count, respectively. Content included in the NAS security context described above is merely briefly described, and constitutes no limitation on the protection scope of this application.

In conclusion, in the embodiment shown in FIG. 4, when the handover fails, both the UE and the first AMF resume using the first NAS security context to perform NAS security protection such that the AMF key and the NAS key used by the UE are the same as the AMF key and the NAS key used by the first AMF.

Figure 5:
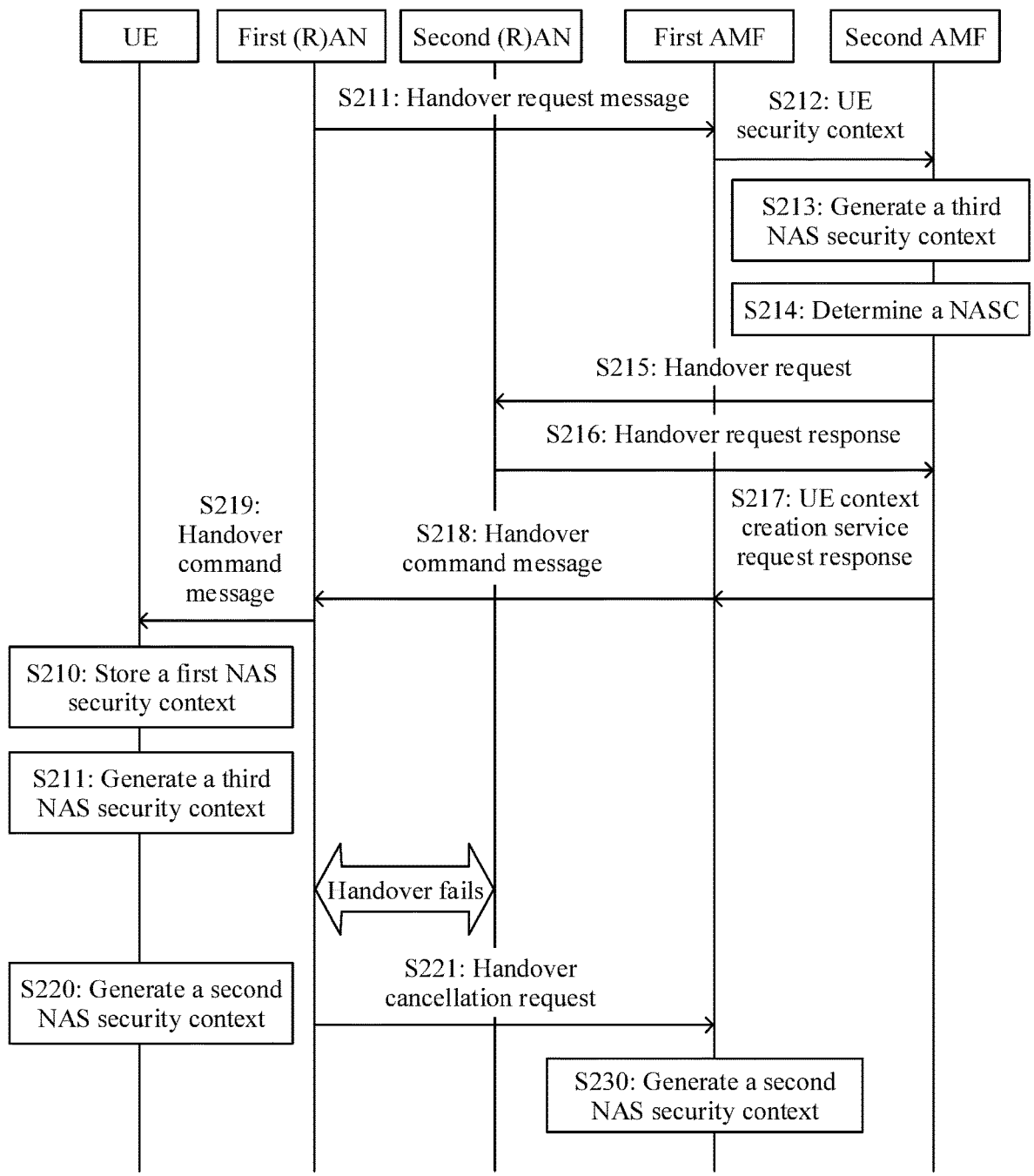
FIG. 5 is a schematic flowchart of another handover handling method according to an embodiment of this application.

FIG. 5 is a schematic flowchart of another handover handling method according to an embodiment of this application. The schematic flowchart includes UE, a first AMF, a second AMF, a first (R)AN, a second (R)AN, and S210 to S240. The following describes in detail a method procedure shown in FIG. 5.

Before a handover, a NAS security context on the UE and a NAS security context on the first AMF each include Kamf, Knasenc, Knasint, a DL NAS count (where the DL NAS count is equal to X), a NAS security algorithm negotiated between the UE and the first AMF, and the like. In the embodiment shown in FIG. 5, the NAS security contexts on the UE and the first AMF before the handover are collectively referred to as a first NAS security context.

S211: The first (R)AN sends a handover request message to the first AMF.

In the embodiment shown in FIG. 5, the step of sending, by the first (R)AN, a handover request message to the first AMF is similar to S1 in FIG. 2. Therefore, details are not described herein again.

S212: The first AMF sends a UE security context to the second AMF.

Further, the step of sending, by the first AMF, a UE security context to the second AMF may be initiating, by the first AMF, a UE context creation service request to the second AMF. The following two possible cases are included.

In a possible case 1, if the first AMF does not perform key derivation on the key Kamf included in the first NAS security context, the UE security context sent by the first AMF to the second AMF includes the Kamf, a DL NAS count (where the DL NAS count is equal to X+1), the NAS security algorithm negotiated between the UE and the first AMF, and a NAS security algorithm list supported by the UE.

In a possible case 2, if the first AMF performs key derivation on the key Kamf included in the first NAS security context, the UE security context sent by the first AMF to the second AMF includes Kamf', a DL NAS count (where the DL NAS count is equal to X+1), the NAS security algorithm negotiated between the UE and the first AMF, a NAS security algorithm list supported by the UE, and a key derivation indication. The key derivation indication is used to indicate that a key in the UE security context sent by the first AMF to the second AMF is obtained through the key derivation by the first AMF. The key derivation indication may be referred to as K_AMF_change_flag. Further, when a value of the K_AMF_change_flag is 1, it indicates that the key in the UE security context sent by the first AMF to the second AMF is obtained through the key derivation by the first AMF.

In the embodiment shown in FIG. 5, after receiving the UE security context sent by the first AMF, the second AMF performs the following step.

S213: The second AMF generates a third NAS security context. Further, in the embodiment shown in FIG. 5, the step of generating, by the second AMF, a third NAS security context is similar to the step of generating, by the second AMF, a third NAS security context in the embodiment shown in FIG. 4. Therefore, details are not described herein again.

Further, after generating the third NAS security context, the second AMF determines a NASC based on the new NAS security context. In other words, the embodiment shown in FIG. 5 further includes S214 The second AMF determines the NASC. Further, in the embodiment shown in FIG. 5, the step of determining, by the second AMF, the NASC is similar to the step of determining, by the second AMF, the NASC in the embodiment shown in FIG. 4. Therefore, details are not described herein again.

It should be understood that the second AMF needs to send the NASC to the UE. Further, the NASC needs to be sent to the UE through forwarding by the second (R)AN, the first AMF, and the first (R)AN. A manner of sending the NASC to the UE is not limited in this embodiment of this application. For details, refer to a manner specified in an existing protocol. The manner is similar to the manner of sending, by the second AMF, the NASC to the UE in the embodiment shown in FIG. 4. Therefore, details are not described herein again.

S210: The UE stores the first NAS security context.

After the UE receives a handover command message sent by the first (R)AN to obtain the NASC, the UE first stores the first NAS security context, then updates the first NAS security context based on information in the NASC to obtain a third NAS security context, that is, performs S211.

S220: The UE generates a second NAS security context.

When the UE finds that the handover fails, that the UE generates the third NAS security context includes the following several possible cases.

In a possible case 1, a NAS security algorithm that is negotiated between the UE and the second AMF and included in the NASC is different from the NAS security algorithm negotiated between the UE and the first AMF, and the NASC carries the K_AMF_change_flag with the value of 1. The K_AMF_change_flag with the value of 1 carried in the NASC indicates that the UE needs to perform the key derivation to obtain the Kamf'.

The UE performs the key derivation on the Kamf to obtain the Kamf'. Further, the UE generates the second NAS security context based on the second key Kamf' and the NAS security algorithm that is negotiated between the UE and the first AMF and included in the stored first NAS security context. Then, the UE deletes the first NAS security context and the third NAS security context that is generated in S211, and the UE starts to use the second NAS security context to perform NAS protection between the UE and the first AMF.

In a possible case 2, a NAS security algorithm that is negotiated between the UE and the second AMF and included in the NASC is different from the NAS security algorithm negotiated between the UE and the first AMF.

The UE uses the first NAS security context to perform NAS protection between the UE and the first AMF. This is similar to the step in the embodiment shown in FIG. 4.

In a possible case 3, the NASC carries the K_AMF_change_flag with the value of 1.

The UE performs the key derivation on the Kamf to obtain the Kamf'. Further, the UE generates the second NAS security context based on the second key Kamf' and the NAS security algorithm that is negotiated between the UE and the first AMF and included in the stored first NAS security context. Then, the UE deletes the first NAS security context and the third NAS security context that is generated in S211, and the UE starts to use the second NAS security context to perform NAS protection between the UE and the first AMF.

Further, after finding that the handover fails, the UE needs to notify, through the first (R)AN, the first AMF to cancel the handover. In this case, the method procedure shown in FIG. 5 further includes the following steps.

S221: The first (R)AN sends a handover cancellation request to the first AMF.

S230: The first AMF generates a second NAS security context.

That the first AMF side generates the second NAS security context after receiving the handover cancellation request includes the following two possible cases.

In a possible case 1, the first AMF performs the key derivation on the Kamf before performing S212, to obtain the second key Kamf'. In this case, after receiving the handover cancellation request, the first AMF side generates the second NAS security context based on the Kamf' and the NAS security algorithm that is negotiated between the UE and the first AMF and included in the first NAS security context. Then, the first AMF side uses the second NAS security context to perform NAS security protection between the first AMF and the UE. In the embodiment shown in FIG. 5, the possible case 1 in which the first AMF generates the second NAS security context is mainly considered.

In a possible case 2, the first AMF does not perform the key derivation on the Kamf before performing S212. In this case, after receiving the handover cancellation request, the first AMF side uses the first NAS security context to perform NAS protection between the UE and the first AMF. This is similar to the step in the embodiment shown in FIG. 4.

In conclusion, in the embodiment shown in FIG. 5, when the handover fails, both the UE and the first AMF use the second NAS security context to perform NAS security protection such that the NAS key used by the UE is the same as the NAS key used by the first AMF.

It should be understood that sequence numbers of the foregoing processes do not mean execution sequences in the foregoing method embodiments. The execution sequences of the processes should be determined based on functions and internal logic of the processes, and should not be construed as any limitation on the implementation processes of the embodiments of this application.

It should be further understood that "first" and "second" in this application are merely used for differentiation, and shall not be construed as any limitation on this application. The first NAS security context and the second NAS security context are merely used to differentiate between different NAS security contexts.

The foregoing describes in detail the handover handling methods provided in the embodiments of this application with reference to FIG. 4 and FIG. 5. The following describes in detail handover handling apparatuses provided in the embodiments of this application with reference to FIG. 6 to FIG. 9.

Figure 6:
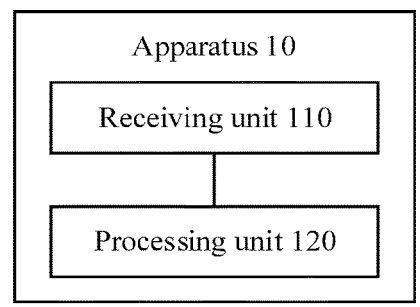
FIG. 6 is a schematic diagram of a handover handling apparatus according to an embodiment of this application.

FIG. 6 is a schematic diagram of a handover handling apparatus 10 according to this application. As shown in FIG. 6, the apparatus 10 includes a receiving unit 110 and a processing unit 120.

The receiving unit 110 is configured to receive a handover command message sent by a first access network device, where the handover command message carries a second NAS security algorithm selected by a second AMF and an AMF key change indication.

The processing unit 120 is configured to store a first NAS security context when the second NAS security algorithm is different from a first NAS security algorithm currently used by the UE and/or the AMF key change indication is 1, where the first NAS security context is a NAS security context generated through negotiation between the UE and a first AMF.

The processing unit 120 is further configured to, when a handover fails, use the first NAS security context to perform NAS protection between the UE and the first AMF.

The apparatus 10 exactly corresponds to the UE in the method embodiments. The apparatus 10 may be the UE in the method embodiments, or a chip or a functional module in the UE in the method embodiments. A corresponding unit in the apparatus 10 is configured to perform a corresponding step performed by the UE in the method embodiments shown in FIG. 4 and FIG. 5.

The receiving unit 110 in the apparatus 10 performs a receiving step performed by the UE in the method embodiments. For example, the receiving unit 110 performs step 1191 of receiving the handover command message sent by the first (R)AN in FIG. 4 and step 219 of receiving the handover command message sent by the first (R)AN in FIG. 5.

The processing unit 120 performs an internal implementation or processing step performed by the UE in the method embodiments. For example, the processing unit 120 performs step 130 of storing the first NAS security context in FIG. 4, step 131 of generating the third NAS security context in FIG. 4, step 140 of resuming using the first NAS security context in FIG. 4 or step 132 of continuing to use the first NAS security context in FIG. 4, step 210 of storing the first NAS security context in FIG. 5, step 211 of generating the third NAS security context in FIG. 5, and step 220 of generating the second NAS security context in FIG. 5.

The handover handling apparatus 10 shown in the FIG. 6 may further include a sending unit (not shown in FIG. 6). The sending unit is configured to perform a function of sending a message to another device. The receiving unit 110 and the sending unit may form a transceiver unit, and have both a receiving function and a sending function. The processing unit 120 may be a processor, the sending unit may be a transmitter, the receiving unit 110 may be a receiver, and the receiver and the transmitter may be integrated to form a transceiver.

Figure 7:
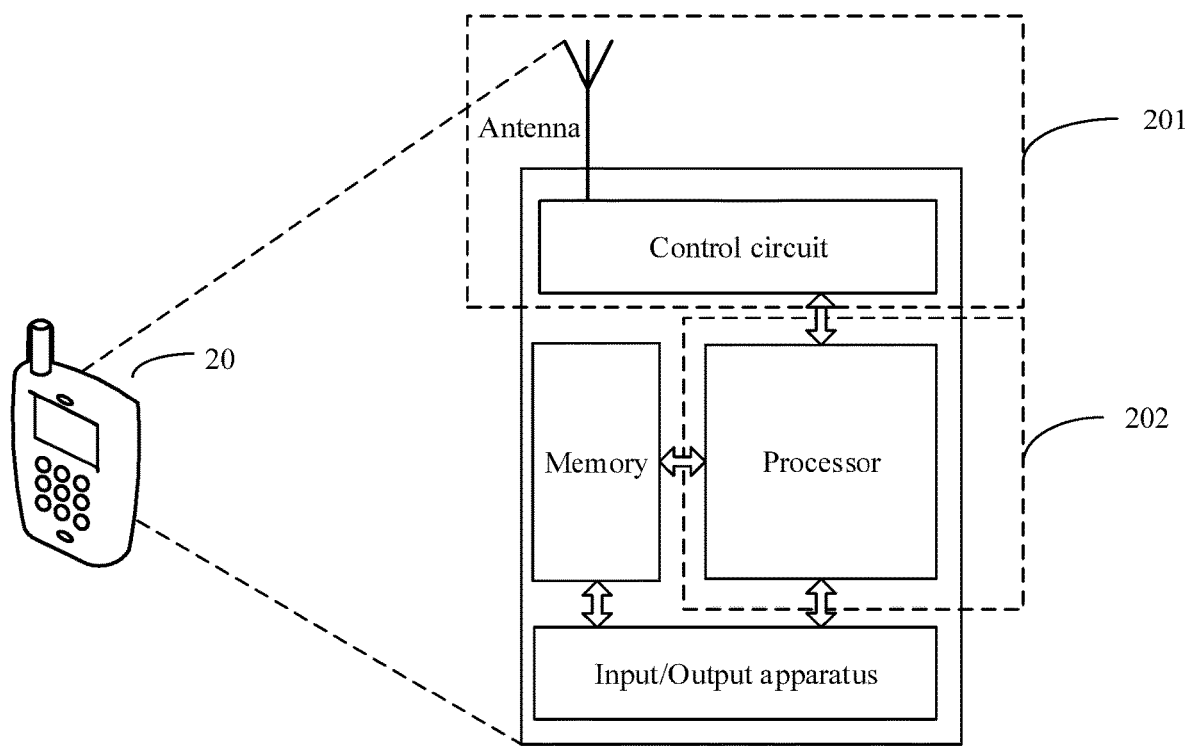
FIG. 7 is a schematic structural diagram of UE applicable to an embodiment of this application.

FIG. 7 is a schematic structural diagram of UE 20 applicable to an embodiment of this application. The UE 20 may be applied to a system shown in FIG. 1. For ease of description, FIG. 7 shows only main components in the UE. As shown in FIG. 7, the UE 20 includes a processor, a memory, a control circuit, an antenna, and an input/output apparatus. The processor is configured to control the antenna and the input/output apparatus to receive and send a signal. The memory is configured to store a computer program. The processor is configured to invoke the computer program from the memory and run the computer program, to perform a corresponding procedure and/or operation performed by the UE in the handover handling methods provided in this application. Details are not described herein.

A person skilled in the art may understand that, for ease of description, FIG. 7 shows only one memory and only one processor. Actually, UE may include a plurality of processors and memories. The memory may also be referred to as a storage medium, a storage device, or the like. This is not limited in the embodiments of this application.

Figure 8:
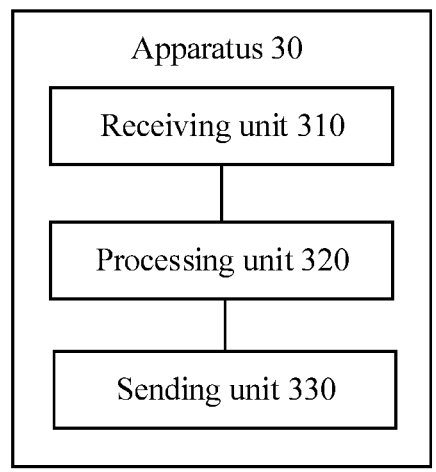
FIG. 8 is a schematic diagram of a handover handling apparatus according to an embodiment of this application.

FIG. 8 is a schematic diagram of a handover handling apparatus 30 according to this application. As shown in FIG. 8, the apparatus 30 includes a receiving unit 310, a processing unit 320, and a sending unit 330.

The receiving unit 310 is configured to receive a handover request message sent by a first access network device.

The processing unit 320 is configured to determine, according to a local policy, that key derivation needs to be performed.

The processing unit 320 is further configured to store a first NAS security context, where the first NAS security context is a NAS security context generated through negotiation between a first AMF and UE.

The sending unit 330 is configured to send a UE security context to a second AMF.

The processing unit 320 is further configured to resume using the first NAS security context.

The apparatus 30 exactly corresponds to the first AMF in the method embodiments. The apparatus 30 may be the first AMF in the method embodiments, or a chip or a functional module in the first AMF in the method embodiments. A corresponding unit in the apparatus 30 is configured to perform a corresponding step performed by the first AMF in the method embodiments shown in FIG. 4 and FIG. 5.

The receiving unit 310 in the apparatus 30 performs a receiving step performed by the first AMF in the method embodiments. For example, the receiving unit 310 performs step 111 of receiving the handover request message sent by the first (R)AN in FIG. 4, step 118 of receiving the UE context creation service request response sent by the second AMF in FIG. 4, step 211 of receiving the handover request message sent by the first (R)AN in FIG. 5, and step 217 of receiving the UE context creation service request response sent by the second AMF in FIG. 5.

The processing unit 320 performs an internal implementation or processing step performed by the first AMF in the method embodiments. For example, the processing unit 320 performs step 110 of storing the first NAS security context in FIG. 4, step 112 of performing the key derivation in FIG. 4, step 120 of resuming using the first NAS security context in FIG. 4, and step 230 of generating the second NAS security context in FIG. 5.

The sending unit 330 performs a sending step performed by the first AMF in the method embodiments. For example, the sending unit 330 performs step 113 of sending the UE security context to the second AMF in FIG. 4, step 119 of sending the handover command message to the first (R)AN in FIG. 4, step 212 of sending the UE security context to the second AMF in FIG. 5, and step 218 of sending the handover command message to the first (R)AN in FIG. 5.

The receiving unit 310 and the sending unit 330 may form a transceiver unit, and have both a receiving function and a sending function. The processing unit 320 may be a processor, the sending unit 330 may be a transmitter, the receiving unit 310 may be a receiver, and the receiver and the transmitter may be integrated to form a transceiver.

Figure 9:
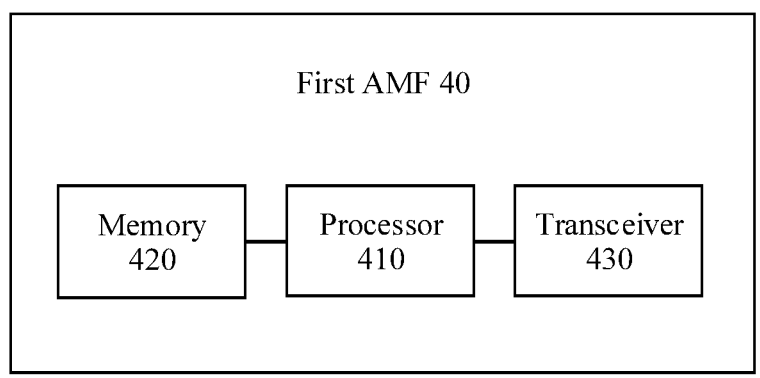
FIG. 9 is a schematic structural diagram of a first AMF applicable to an embodiment of this application.

As shown in FIG. 9, an embodiment of this application further provides a first AMF 40. The first AMF 40 includes a processor 410, a memory 420, and a transceiver 430. The memory 420 stores an instruction or a program. The processor 410 is configured to execute the instruction or the program stored in the memory 420. When the instruction or the program stored in the memory 420 is executed, the transceiver 430 is configured to perform operations performed by the receiving unit 310 and the sending unit 330 in the apparatus 30 shown in FIG. 8.

An embodiment of this application further provides a computer-readable storage medium. The computer-readable storage medium stores an instruction. When the instruction is run on a computer, the computer is enabled to perform the steps performed by the first AMF in the methods shown in FIG. 4 and FIG. 5.

An embodiment of this application further provides a computer-readable storage medium. The computer-readable storage medium stores an instruction. When the instruction is run on a computer, the computer is enabled to perform the steps performed by the UE in the methods shown in FIG. 4 and FIG. 5.

An embodiment of this application further provides a computer program product including an instruction. When the computer program product runs on a computer, the computer is enabled to perform the steps performed by the first AMF in the methods shown in FIG. 4 and FIG. 5.

An embodiment of this application further provides a computer program product including an instruction. When the computer program product runs on a computer, the computer is enabled to perform the steps performed by the UE in the methods shown in FIG. 4 and FIG. 5.

An embodiment of this application further provides a chip, including a processor. The processor is configured to read a computer program stored in a memory and run the computer program, to perform a corresponding operation and/or procedure performed by the UE in the handover handling methods provided in this application. Optionally, the chip further includes the memory. The memory is connected to the processor through a circuit or a cable. The processor is configured to read and execute the computer program in the memory. Optionally, the chip further includes a communications interface, and the processor is connected to the communications interface. The communications interface is configured to receive data and/or information that need/needs to be processed. The processor obtains the data and/or information from the communications interface, and processes the data and/or information. The communications interface may be an input/output interface.

This application further provides a chip, including a processor. The processor is configured to invoke a computer program stored in a memory and run the computer program, to perform a corresponding operation and/or procedure performed by the first AMF in the handover handling methods provided in this application. Optionally, the chip further includes the memory. The memory is connected to the processor through a circuit or a cable. The processor is configured to read and execute the computer program in the memory. Optionally, the chip further includes a communications interface, and the processor is connected to the communications interface. The communications interface is configured to receive data and/or information that need/needs to be processed. The processor obtains the data and/or information from the communications interface, and processes the data and/or information. The communications interface may be an input/output interface.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to other approaches, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a Universal Serial Bus (USB) flash drive, a removable hard disk, a ROM, a random-access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A handover method comprising:
receiving, by a handover apparatus served by a first access and management fuunction entity, a handover command message from an access network device, wherein the handover command message carries a Non-Access Stratum (NAS) container, and wherein the NAS container comprises a key derivation indication;
obtaining, by the handover apparatus, a second access and management function key based on a first access and management function key in response to the key derivation indication, wherein the first access and management function key is included in a first NAS security context that is used between the handover apparatus and the first access and management function entity before the handover apparatus implements the handover, and wherein the second access and management function key is included in a second NAS security context;
performing, by the handover apparatus, integrity verification on the NAS container in the handover command message; and
continuing to use, by the handover apparatus, in response to the integrity verification on the NAS container failing, the first NAS security context.

2. The handover method of claim 1, further comprising deleting the second NAS security context when the integrity verification fails.

3. The handover method of claim 1, further comprising using the second NAS security context to perform security protection on information transmitted between the handover apparatus and a second access and management function entity associated with the second access and management function key when the integrity verification succeeds.

4. The handover method of claim 1, wherein continuing to use the first NAS security context comprises using the first NAS security context to perform security protection on information transmitted between the handover apparatus and the first access and management function entity.

5. The handover method of claim 1, further comprising keeping the first NAS security context when the NAS container comprises the key derivation indication and the value of the key derivation indication is one.

6. The handover method of claim 1, further comprising sending a handover cancellation request to the first access and management function entity through the access network device when the integrity verification fails.

7. The handover method of claim 1, further comprising using the first NAS security context to perform NAS protection between the handover apparatus and the first access and management function entity before the handover.

8. The handover method of claim 1, further comprising setting a flag bit to differentiate the first NAS security context from the second NAS security context.

9. The handover method of claim 1, wherein performing integrity verification on the NAS container in the handover command message comprises using the second NAS security context to perform integrity verification on the NAS container in the handover command message.

10. The handover method of claim 1, further comprising deleting the second NAS security context when the integrity verification fails.

11. The handover method of claim 1, wherein the key derivation indication indicates to obtain the second access and management function key based on the first access and management function key.

12. The handover method of claim 1, wherein a value of the key derivation indication is one.

13. A handover apparatus comprising:
a receiver configured to receive a handover command message from an access network device, wherein the handover command message carries a Non-Access Stratum (NAS) container, and wherein the NAS container comprises a key derivation indication; and
a processor coupled to the receiver and configured to:
obtain a second access management function key based on a first access and management function key in response to the key derivation indication, wherein the first access and management function key is included in a first NAS security context that is used between the handover apparatus and a first access and management function entity serving the handover apparatus before the handover apparatus implements a handover, and wherein the second access and management function key is included in a second NAS security context;
perform integrity verification on the NASC in the handover command message; and
continue to use, in response to the integrity verification on the NAS container failing, the first NAS security context.

14. The handover apparatus of claim 13, wherein the processor is further configured to delete the second NAS security context when the integrity verification fails.

15. The handover apparatus of claim 13, wherein the processor is further configured to use the second NAS security context to perform security protection on information transmitted between the handover apparatus and the second access and management function entity associated with the second access and management function key when the integrity verification succeeds.

16. The handover apparatus of claim 13, wherein the processor continues to use, in response to the integrity verification on the NAS container failing, the first NAS security context by using, in response to the integrity verification on the NAS container failing, the first NAS security context to perform security protection on information transmitted between the handover apparatus and the first access and management function entity.

17. The handover apparatus of claim 13, wherein the processor is further configured to store the first NAS security context when the NAS container comprises the key derivation indication and the value of the key derivation indication is one.

18. The handover apparatus of claim 13, further comprising a transmitter coupled to the processor and the receiver and configured to send a handover cancellation request to the first access and management function entity through the access network device when the integrity verification fails.

19. The handover apparatus of claim 13, wherein the processor is further configured to use the first NAS security context to perform NAS protection between the handover apparatus and the first access and management function entity before the handover.

20. The handover apparatus of claim 13, wherein the processor is further configured to set a flag bit to differentiate the first NAS security context from the second NAS security context.

21. The handover apparatus of claim 13, wherein the processor performs integrity verification on the NAS container in the handover command message by using the second NAS security context.

22. The handover apparatus of claim 13, wherein the key derivation indication indicates to obtain the second access and management function key based on the first access and management function key.

23. The handover apparatus of claim 13, wherein a value of the key derivation indication is one.

24. A computer program product comprising computer-executable instructions for storage on a non-transitory computer-readable storage medium that, when executed by a processor, cause an apparatus to:
receive a handover command message from a first access network device, wherein the handover command message carries a Non-Access Stratum (NAS) container, and wherein the NAS container comprises a key derivation indication;
obtain a second access and management function key based on a first access and management function key is in response to the derivation indication, wherein the first access and management function key is included in a first NAS security context that is used between the apparatus and a first access and management function entity serving the apparatus before a handover, and wherein the second access and management function key is included in a second NAS security context;
perform integrity verification on the NAS container in the handover command message; and
continue to use, in response to the integrity verification on the NAS container failing, the first NAS security context.

25. The computer program product of claim 24, wherein when the instructions are executed by the processor, the instructions further cause the apparatus to use the first NAS security context to perform NAS protection between the apparatus and the first access and management function entity before the handover.

26. The computer program product of claim 24, wherein when the instructions are executed by the processor, the instructions further cause the apparatus to set a flag bit to differentiate the first NAS security context from the second NAS security context.

27. The computer program product of claim 24, wherein when the instructions are executed by the processor, the instructions further cause the apparatus to perform integrity verification on the NAS container in the handover command message by using the second NAS security context.

28. The computer program product of claim 24, wherein when the instructions are executed by the processor, the instructions further cause the apparatus to delete the second NAS security context when the integrity verification fails.

29. The computer program product of claim 24, wherein the key derivation indication indicates to obtain the second access and management function key based on the first access and management function key.

30. The computer program product of claim 24, wherein a value of the key derivation indication is one.

31. A chip comprising:
a processor coupled to a memory storing instructions and configured to execute the instructions to cause the chip to:
receive a handover command message from a first access network device, wherein the handover command message carries a Non-Access Stratum (NAS)

container, and wherein the NAS container comprises a key derivation indication;

obtain a second access and management function key based on a first access and management function key in response to the key derivation indication, wherein the first access and management function key is included in a first NAS security context that is used between a handover apparatus comprising the chip and a first access and management function entity serving the handover apparatus before a handover, and wherein the second access and management function key is included in a second NAS security context;

perform integrity verification on the NAS container in the handover command message; and continue to use, in response to the integrity verification on the NAS container failing, the first NAS security context.

32. The chip of claim 31, wherein the computer program further causes the processor to be configured to delete the second NAS security context when the integrity verification fails.

33. The chip of claim 31, wherein the computer program further causes the processor to be configured to use the first NAS security context to perform NAS protection between the handover apparatus and the first access and management function entity before the handover.

34. The chip of claim 31, wherein the computer program further causes the processor to be configured to set a flag bit to differentiate the first NAS security context from the second NAS security context.

35. The chip of claim 31, wherein the computer program further causes the processor to perform integrity verification on the NAS container in the handover command message by using the second NAS security context.

36. The chip of claim 31, wherein the key derivation indication indicates to obtain the second access and management function key based on the first access and management function key.

37. The chip of claim 31, wherein a value of the key derivation indication is one.

* * * * *

UNITED STATES PATENT AND TRADEMARK OFFICE
CERTIFICATE OF CORRECTION

PATENT NO. : 11,576,092 B2
APPLICATION NO. : 16/939926
DATED : February 7, 2023
INVENTOR(S) : Fei Li and Linping Yang It is certified that error appears in the above-identified patent and that said Letters Patent is hereby corrected as shown below:

In the Claims

Claim 1, Column 28, Line 7: "management fuunction entity," should read "management function entity,"

Signed and Sealed this
Twenty-eighth Day of March, 2023

Katherine Kelly Vidal
*Director of the United States Patent and Trademark Office*